(12) United States Patent
Hasegawa et al.

(10) Patent No.: US 11,513,279 B2
(45) Date of Patent: Nov. 29, 2022

(54) LIGHTING DEVICE

(71) Applicant: Japan Display Inc., Tokyo (JP)

(72) Inventors: Makoto Hasegawa, Tokyo (JP); Masafumi Okada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/696,965

(22) Filed: Mar. 17, 2022

(65) Prior Publication Data

US 2022/0299697 A1 Sep. 22, 2022

(30) Foreign Application Priority Data

Mar. 19, 2021 (JP) .............................. JP2021-045714

(51) Int. Cl.
*F21V 8/00* (2006.01)
(52) U.S. Cl.
CPC ......... *G02B 6/0053* (2013.01); *G02B 6/0073* (2013.01)
(58) Field of Classification Search
CPC ....................... G02B 6/0053; G02B 6/0073
See application file for complete search history.

(56) References Cited

U.S. PATENT DOCUMENTS

| | | | |
|---|---|---|---|
| 4,642,477 A * | 2/1987 | Grzanowski, Jr. ..... | G08B 7/064 307/115 |
| 5,449,976 A * | 9/1995 | Kemp ..................... | H05B 41/34 315/86 |
| 5,992,094 A * | 11/1999 | Diaz ....................... | G01V 1/008 109/6 |
| 7,701,355 B1 * | 4/2010 | Billman .................. | G08B 7/066 340/627 |
| 10,349,495 B2 * | 7/2019 | Fathollahi ............... | F21V 23/04 |
| 2005/0128068 A1 * | 6/2005 | Winick .................. | G08B 25/008 340/517 |
| 2008/0169910 A1 * | 7/2008 | Greene .................... | H02J 50/70 340/10.34 |
| 2016/0173746 A1 * | 6/2016 | Chien ..................... | H04N 7/181 348/159 |
| 2016/0259115 A1 * | 9/2016 | Kitano ................... | G02B 5/0242 |
| 2017/0175996 A1 * | 6/2017 | Chien ..................... | F21S 9/022 |
| 2019/0025657 A1 * | 1/2019 | Presniakov ........ | G02F 1/134363 |
| 2020/0211341 A1 * | 7/2020 | Rossi .................... | H05B 47/115 |

FOREIGN PATENT DOCUMENTS

JP 2012-69409 A 4/2012
KR 2009072446 A * 7/2009

* cited by examiner

*Primary Examiner* — Mary Ellen Bowman
(74) *Attorney, Agent, or Firm* — Xsensus LLP

(57) ABSTRACT

A lighting device including: a light guide having a first side surface extending in a first direction and a second side surface opposing to the first side surface and extending in the first direction, a first LED being disposed at the first side surface, a second LED being disposed at the second side surface; in which a first area extends in the first direction and a second area extends in the second direction in the light guide; a prism sheet is disposed on the light guide; a prism extending in the first direction and arranged in the second direction is formed on the prism sheet; a first surface of the prism has a first angle with normal direction of the second prism sheet; a second surface of the prism has a second angle with normal direction of the second prism sheet; the first angle is larger than the second angle.

17 Claims, 16 Drawing Sheets

LIGHTING DEVICE

CROSS-REFERENCE TO RELATED APPLICATION

The present application claims priority from Japanese Patent Application JP 2021-045714 filed on Mar. 19, 2021, the content of which is hereby incorporated by reference into this application.

BACKGROUND OF THE INVENTION

(1) Field of the Invention

The present invention relates to a lighting device in which emitting direction can be changed easily or can be collimated in a plurality of directions.

(2) Description of the Related Art

Collimated light is sometimes needed in the seats of airplanes or trains. There are also demands in cars and so forth to emit light in different directions according to purposes. On the other hand, there is a demand to emit light in different directions from the light source. In such a situation, there are measures as: change a direction of light source; providing a reflecting plate to change a direction of light from the light source; providing a lens to change a direction of light from the light source, and so forth.

Patent document 1 discloses a structure of lighting device, in which a refracting means is set over a direct type light source to change a direction of the light. As for the light refracting means, lenses, prisms, liquid lenses, liquid crystal lenses and so forth are disclosed.

Patent document 2 discloses to use a liquid crystal lens in various optical devices.

PRIOR TECHNICAL DOCUMENT

Patent Documents

Patent document 1: Japanese patent application laid open No. 2012-069409
Patent document 2: US 2019/0025657 A1

SUMMARY OF THE INVENTION

When collimated light is necessary in each of the seats of airplanes or trains, or light is necessary in a plurality of directions in e.g. cars, a lighting device can be set in every seats in e.g. an airplane; in this structure, however, many lighting devices are necessary, thus, weight or space for the lighting devices become a problem.

Emitting direction of light can be changed by rotating a light source; however, in this case, a mechanical driving apparatus is necessary, thus, a size of the lighting device becomes large. A method to dispose a refraction means at the emitting surface of light source raises a problem that the lighting device becomes large due to a refraction means, and a driving apparatus for the refraction means is necessary.

The purpose of the present invention is to realize a lighting device of thin, space saving, and that a direction of light is easily changeable. Another purpose of the present invention is to realize a lighting device of thin, space saving, and that collimated lights can be emitted in a plurality of directions.

The present invention solves the above explained problems; examples of concrete structures of the present invention are as follows.

(1) A lighting device including: a light guide having a first side surface extending in a first direction and a second side surface opposing to the first side surface and extending in the first direction, a first LED being disposed at the first side surface, a second LED being disposed at the second side surface, in which an area in which the first LED is disposed and extends in the second direction is defined as a first area; an area in which the second LED is disposed and extends in the second direction is defined as a second area; a prism sheet is disposed on the light guide; a prism extending in the first direction and arranged in the second direction is formed on the prism sheet; a first surface of the prism has a first angle with respect to normal direction of the second prism sheet; a second surface of the prism has a second angle with respect to normal direction of the second prism sheet; and the first angle is larger than the second angle.

(2) A lighting device including: a light guide having a first side surface extending in a first direction and a second side surface opposing to the first side surface and extending in the first direction, a first LED and a second LED being disposed at either the first side surface or the second side surface, in which an area in which the first LED is disposed and extends in the second direction is defined as a first area; an area in which the second LED is disposed and extends in the second direction is defined as a second area; a first prism sheet is disposed on the light guide; a first prism extending in the first direction and arranged in the second direction is formed on the first prism sheet; light emitted from the first prism sheet is in a normal direction to the first prism sheet; a second prism sheet, disposed on the first prism sheet, has a third area in which a second prism extending in the first direction and arranged in the second direction corresponding to the first area is formed, and a fourth area in which no prism is formed corresponding to the second area; a direction of light exiting the fourth area is in normal direction of the second prism sheet; and a direction of light exiting the third area forms an angle with respect to normal direction of the second prism sheet.

BRIEF DESCRIPTION OF THE DRAWINGS

FIG. 17 is viewed from A direction;

DETAILED DESCRIPTION OF THE PREFERRED EMBODIMENTS

The present invention is explained in detail according to the following embodiments.

Figure 1:
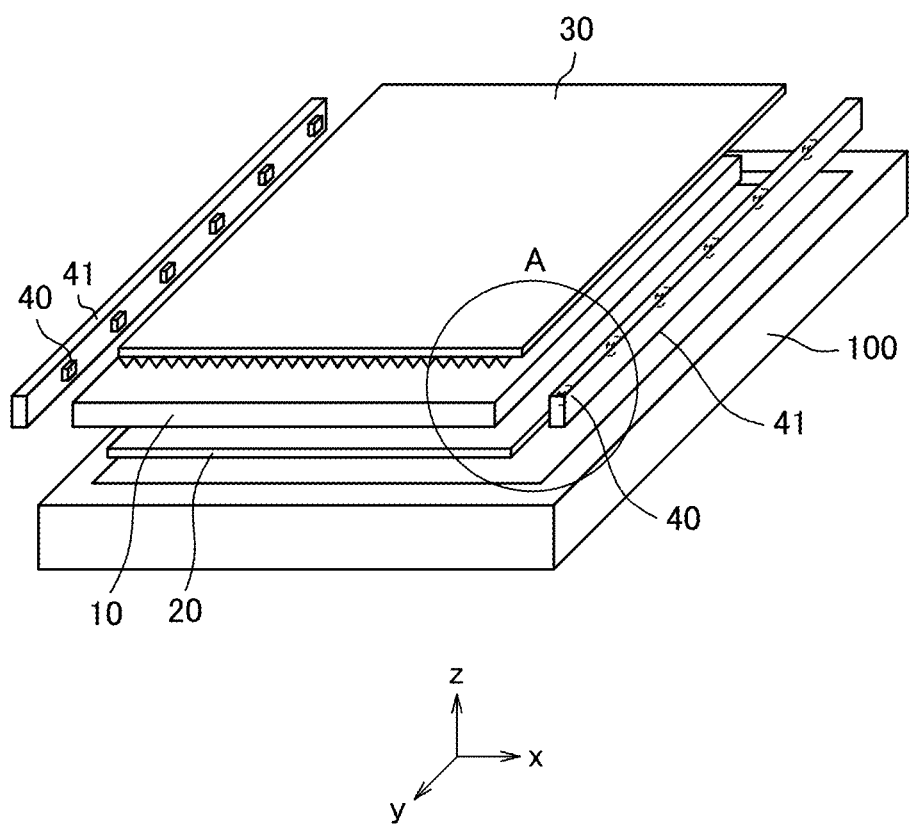
FIG. 1 is a perspective view of a lighting device according to embodiment 1.

FIG. 1 is a perspective view of basic structure of a thin lighting device according to the present invention. The structure of FIG. 1 is a so called side light configuration in which LEDs 40 are disposed at a side surface of the light guide 10; the side light configuration can make the lighting device thin. In FIG. 1, a plurality of LEDs 40 are disposed in a constant interval at both sides of the light guide 10. The LEDs 40 set at a right side surface of the light guide 10 and the LEDs 40 set at a left side surface of the light guide 10 are disposed alternately to each other with respect to y direction, thus, LEDs 40 do not oppose to each other. Lighting area to the light guide 10 are different in each of the LEDs 40, and the lighting area from the left side and the lighting area from the right side of the light guide are alternately set in y direction. The LEDs 40 are arranged on the LED substrate 41 in y direction.

A reflection sheet 20 is disposed under the light guide 10. The reflection sheet 20 reflects the light which goes down from the light guide 10 to upward to the emitting surface of the light guide 10. A sheet on which aluminum is deposited by vacuum evaporation can be used as the reflection sheet 20; however, it is preferable to use a sheet on which silver, which has higher reflectivity than aluminum, is deposited by vacuum evaporation. For example, ESR (Enhanced Specular Reflector, product of 3M) can be used for the reflection sheet 20; a thickness of it is approximately e.g. 70 μm. Sometimes, a film of silver evaporated film of a thickness of 0.155 mm is preferable to avoid adhesion between the light guide 10 and the reflection sheet 20.

In FIG. 1, the light guide 10 is disposed on the reflection sheet 20. A thickness of the light guide 10 is approximately 2 mm. A role of the light guide 10 is to guide the light from the LEDs 40, incident from the side surfaces of the light guide 10, to upper direction, namely to the light emitting surface of the light guide 10. However, as will be explained later, fine prism arrays are formed on the upper surface and on the lower surface of the light guide 10, and the prism arrays determine a direction of light from the light guide 10. The light exiting from the light guide 10 has a distribution with respect to polar angle; the direction in this specification is defined as the direction of main ray, which is a direction of largest light intensity.

The light, which goes down from the light guide 10, is reflected upward by the reflection sheet 20. The light guide 10, the LEDs 40, the reflection sheet 20, prism sheet 30, and so forth are accommodated in the outer frame 100.

Figure 2:
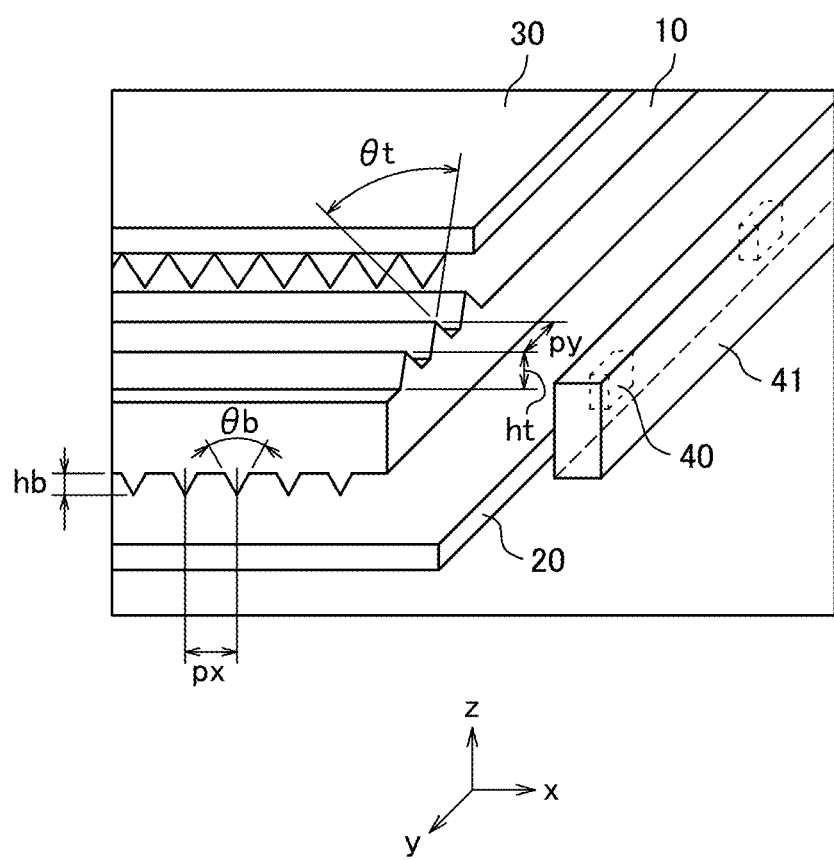
FIG. 2 is a detailed perspective view of the area A of FIG. 1.

FIG. 2 is a detailed perspective view of the circle A area of FIG. 1. The outer frame 100 is omitted in FIG. 2. The prism arrays are formed on the upper surface and the lower surface of the light guide 10 to guide the light, incident from the side surfaces, to a predetermined direction from the exiting surface of the light guide 10. The specifications of the prism arrays of the upper surface (the major surface) and the lower surface are determined as that in what angle the light is emitted from the major surface of the light guide 10. The below is examples of prism arrays on the upper surface and the lower surface of the light guide 10 according to embodiment 1.

A prism array extending in x direction is formed on the upper surface of the light guide 10. The projections of the prism array extend in x direction and are arranged in y direction. A height of the projection ht is e.g. 0.1 μm, a pitch py is e.g. 0.2 μm. An apex angle θt of the prims on the upper surface is e.g. 90 degrees.

A prism array extending in y direction and arranged in x direction is formed on the lower surface of the light guide 10. A height of the projection hb is e.g. 0.002 μm, and a pitch px of the projections is e.g. 0.1 μm on the lower surface of the light guide 10. An apex angle θb of the prims on the lower surface is e.g. 90 degree. In the meantime, the prism arrays formed on the upper surface and on the lower surface of the light guide 10 can be formed by forming V grooves on the surfaces of the light guide 10 instead of projections.

Figure 3:
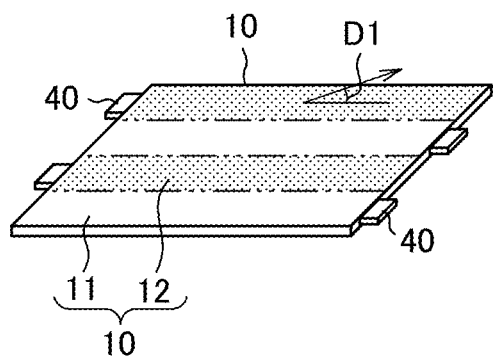
FIG. 3 is a perspective view to show a relation between a light guide and an LED.

FIG. 3 is a perspective view of the light guide 10 and LEDs 40 taken from FIG. 1. In FIG. 3, the LEDs 40 are disposed at both side surfaces of the light guide 10. Each of the LEDs 40 has its own area to supply light in the light guide 10. The two-dot chain lines defines an area in the light guide 10 irradiated by each of the LEDs 40. The two-dot chain lines are, however, imaginary lines; there are no such two-dot chain lines in the actual light guide 10. The area 11 is an area which receives light from the right side LEDs 40, and the area 12 is an area which receives light from the left side LEDs 40. Each of the LEDs 40 mainly supplies light in those predetermined areas, however, some light leaks to other areas.

FIG. 3 shows the LEDs 40 on the left are ON, and the areas indicated by grey in the light guide 10 are irradiated by LEDs 40 on the left. Therefore, the light is emitted only from grey areas 12 of the light guide 10 as depicted by the arrow. Herein after, the arrow defines a direction of main ray. As explained in FIG. 2, prism arrays are formed on the upper surface (main surface) and the lower surface of the light guide 10; according to those prism arrays, the light exits from the upper surface (main surface) of the light guide 10 in a direction of an angle D1 with respect to the main surface of the light guide 10.

Figure 4:
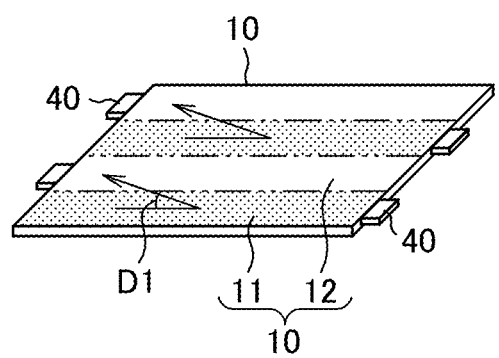
FIG. 4 is another perspective view to show a relation between the light guide and the LED.

FIG. 4 is another perspective view of the light guide 10 and LEDs 40 taken from FIG. 1. FIG. 4 differs from FIG. 3 in that LEDs 40 on the right are ON, and the areas indicated by grey in the light guide 10 are irradiated by LEDs 40 on the right side. Since each of the prism arrays formed on the upper surface (main surface) and the lower surface of the light guide 10 are symmetrical, an angle of the exiting light with respect to the main surface of the light guide 10 is D1, which is the same value as in FIG. 3, however, a direction of the exiting light is different from that in FIG. 3.

Figure 5:
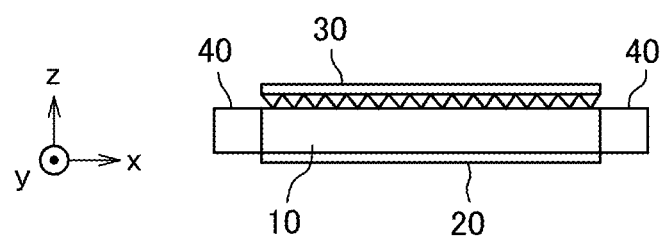
FIG. 5 is a cross sectional view in which a prism sheet is disposed on the light guide.

FIG. 5 is a side view of the light guide 10, the LEDs 40, the reflection sheet 20, and the prism sheet 30, which are taken from FIG. 1. In FIG. 5, the LEDs 40 are disposed at both side surfaces of the light guide 10. The LEDs 40, however, are disposed alternatingly in y direction between the left side and the right side of the light guide 10. A prism sheet 30 is disposed on the upper surface (main surface) of the light guide 10. Since the prism sheet 30 has a scalene triangle shape, the directions of lights which emit from the upper surface (main surface) of the light guide 10 with a certain angle are made different between the light from the LEDs 40 of left hand side and the light from the LEDs 40 of the right hand side.

Figure 6:
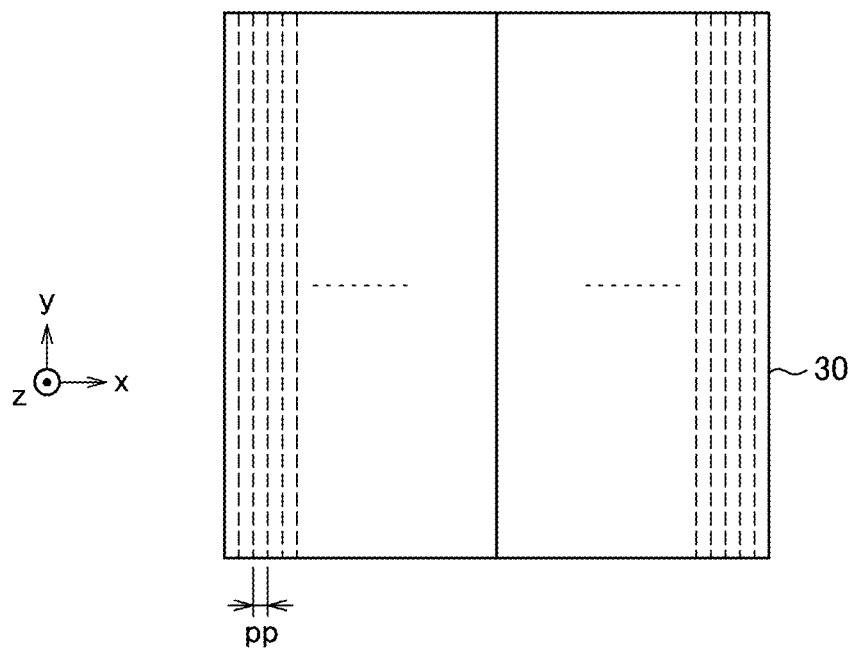
FIG. 6 includes a detailed plan view, a detailed cross sectional view and an enlarged cross sectional view of the prism sheet.
Figure 6:
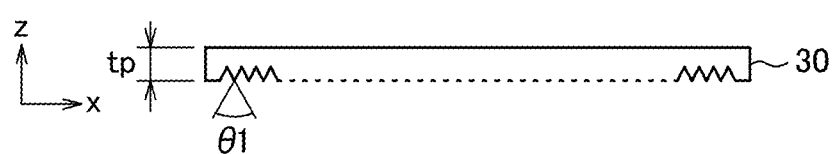
Figure 6:
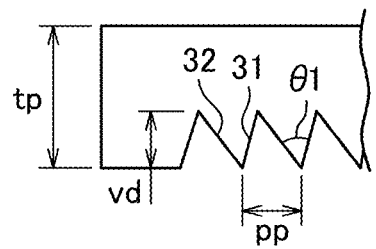

FIG. 6 contains figures of a plan view, a cross sectional view and an enlarged cross sectional view of the prism sheet 30. The prism array in the prism sheet 30 is formed from V grooves. The prism sheet 30 in FIG. 6 is a so called reverse prism sheet. In FIG. 6, the prism array extends in y direction and arranged in x direction. Each of the dimensions in the prism array is as follows. A thickness tp of the prism sheet 30 is e.g. 0.125 mm, a depth vd of the V groove is e.g. 0.075 mm, a pitch pp of the V grooves is e.g. 0.1 mm. Although a cross sectional view of the general prism sheet 30 is an isosceles triangle with an Apex angle θp of e.g. 68 degree, the cross sectional view in the prism sheet 30 in embodiment 1 is different. The cross sectional view of the prism of the prism sheet 30 is, as shown in the bottom figure in FIG. 6, a scalene triangle.

The prism sheet 30 in embodiment 1 directs the emitting light from the light guide 10 in different directions between each of the areas. In other words, the functions of the prism sheet to the light are different between the light emitted from the area 12 of the light guide 10 as depicted in FIG. 3 and the light emitted from the area 11 of the light guide 10 as depicted in FIG. 4. For that purpose, the cross sectional view of the prism of the prism sheet 30 is made a scalene triangle as shown in FIG. 6 at the bottom.

Figure 7:
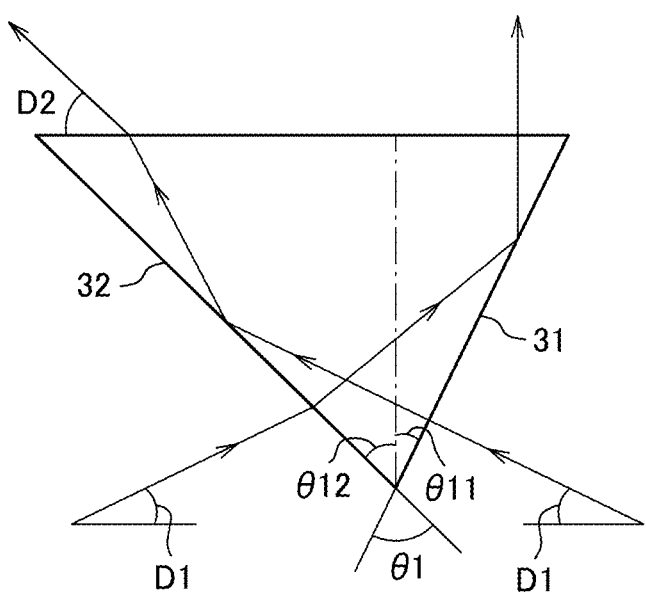
FIG. 7 is a cross sectional view to show a function of the prism of the prism sheet.

FIG. 7 is a cross sectional view that shows a function of the prism shown in FIG. 6. The prism in FIG. 7 is shown as a reverse triangle. An angle between the first plane 31 and the normal line to the base of the reverse triangle is θ11; an angle between the second plane 32 and the normal line to the base of the reverse triangle is θ12; and θ12>θ11. The base of the reverse triangle of FIG. 7 is in a same direction as a main surface of the prism sheet 30 and a normal line to the base line of the reverse triangle of FIG. 7 is in a same direction as a normal line to the prims sheet 30.

The light emitted from the area 12 of the light guide 10 of FIG. 3 enters the left surface 32 of the prism of FIG. 7; the light refracts at the surface 32, performs a total reflection at the right surface 31, and exits from the upper surface of the prism. On the other hand, the light emitted from the area 11 of the light guide 10 of FIG. 3 enters the right surface 31 of the prism of FIG. 7. Since this light enters the right surface 31 at a right angle, it goes directly without refraction, performs a total reflection at the left surface 32, refracts at the upper surface of the prism, and exits from the upper surface of the prism at an angle D2 with respect to the upper surface of the prism.

Figure 8:
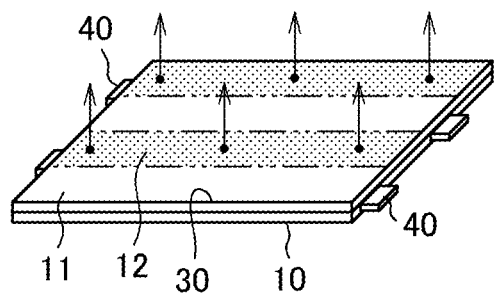
FIG. 8 is a perspective view which shows a function of embodiment 1.
Figure 9:
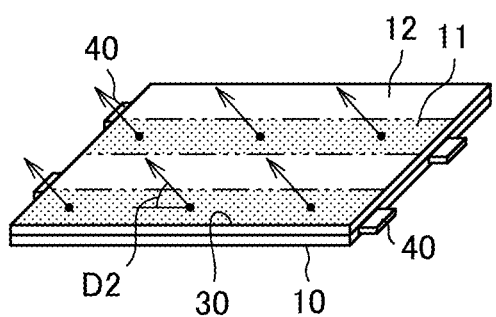
FIG. 9 is another perspective view which shows a function of embodiment 1.
Figure 10:
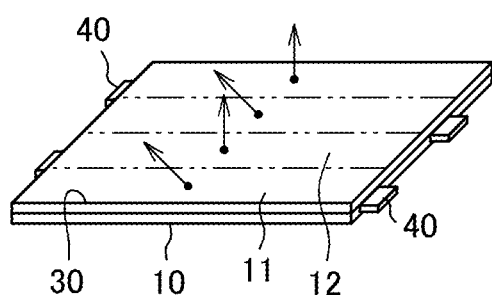
FIG. 10 is yet another perspective view which shows a function of embodiment 1.

As described above, emitting directions can be changed optionally and according to the area of the light guide 10 by making a cross section of the prism of the prism sheet 30 to a scalene triangle and changing an angle of a prism surface. FIG. 8 is a perspective view that the light is emitted only from the area 12 depicted by grey by only turning on the LEDs 40 of left hand side. In FIG. 8, the light exiting from the prism sheet 30 is directed to a normal line direction to the prism sheet 30. FIG. 9 is a perspective view that the light is emitted only from the area 11 depicted by grey by only turning on the LEDs 40 of right hand side. In FIG. 9, the light exiting from the prism sheet 30 is directed to an angle D2 with respect to the major surface of the prism sheet 30.

As described above, the direction of light emitted from the lighting device can be changed as that: LEDs 40 of left hand side are turned on to emit light in a normal direction to the lighting device; LEDs 40 of right hand side are turned on to emit light in a direction of predetermined angle from the lighting device. In the meantime, if light in two directions are needed, the LEDs 40 on the left hand side and the LEDs 40 on the right hand side are turned on simultaneously.

When it is necessary to change a direction of exiting light, the purpose can be performed by only changing the prism sheet 30. Concretely, the lighting device which can change directions of each of two light rays in optional directions can be realized by changing θ11 and θ12 in FIG. 7 of the prism sheet 30.

Embodiment 2

Figure 11:
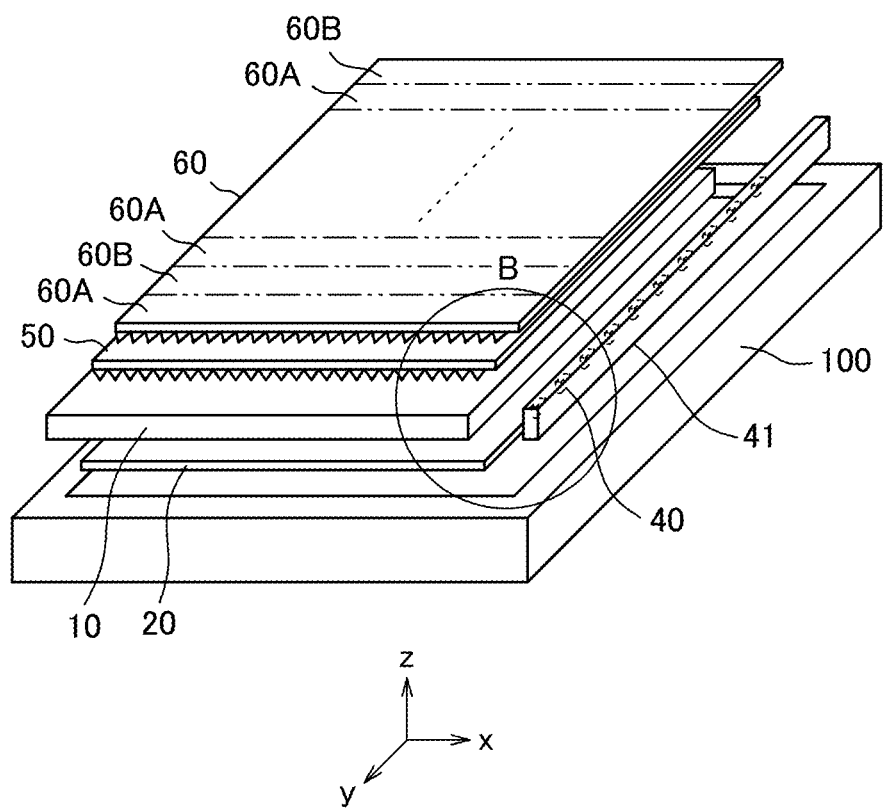
FIG. 11 is a perspective view of embodiment 2.

FIG. 11 is a perspective view of the structure of embodiment 2. FIG. 11 differs from FIG. 1 in that LEDs 40 as a lighting source are disposed only on one side surface of the light guide 10, and two prism sheets, the first prism sheet 50 and the second prism sheet 60, are used. The second prism sheet 60 has two areas, namely, the first area 60A, in which the prism is formed, and the second area 60B, in which the prism is not formed. Other configurations in FIG. 11 are the same as FIG. 1.

Figure 12:
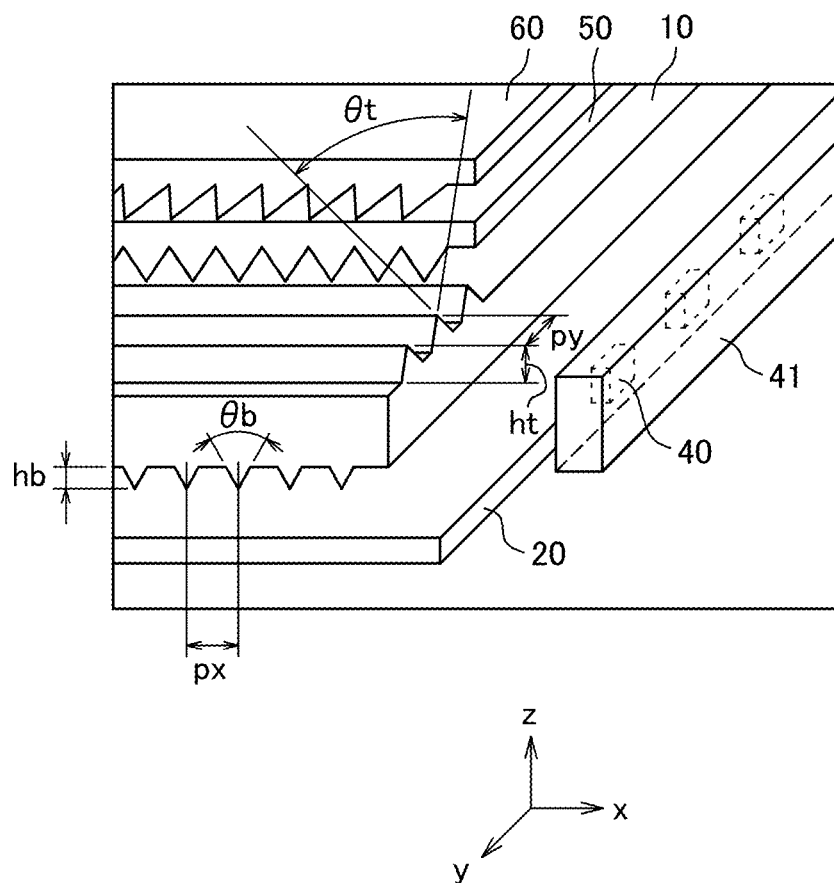
FIG. 12 is an enlarged perspective view of the area B of FIG. 11.

FIG. 12 is a detailed perspective view of the circle B area of FIG. 11. The structure of the light guide in FIG. 12 is the same as explained in FIG. 2 of embodiment 1. Disposition pitch of the LEDs 40 in y direction in FIG. 12 is a half of the pitch of the LEDs 40 in y direction in FIG. 2 because the LEDs 40 are disposed only on one side surface of the light guide 10. Accordingly, the structure of the prism sheet is made different from the structure of the prism sheet in embodiment 1; however, the structure of light guide is the same between embodiment 1 and embodiment 2.

In FIG. 12, the first prism sheet 50 is disposed on the light guide 10; the second prism sheet 60 is disposed on the first prism sheet 50. The prism extends in y direction and a cross sectional view of the prism is an isosceles in the first prism sheet 50. The apex angle of the prism of the first prism sheet 50 is set to direct the light emitted from the light guide 10 in normal direction to the prism sheet 50.

The second prism sheet 60 is disposed on the first prism sheet 50; only the first area 60A, in which prism is formed, of the second prism sheet 60 is shown in FIG. 12. The prism array in the second prism sheet 60 extends in y direction and is arranged in x direction as the same as the prism array in the first prism sheet 50. The cross sectional view of the prism in the second prism sheet 60 is different from the cross sectional view of the prism in the first prism sheet 50. The cross sectional view of the prism in the second prism sheet 60 is rectangular triangle, in which only the first side is inclined.

Figure 13:
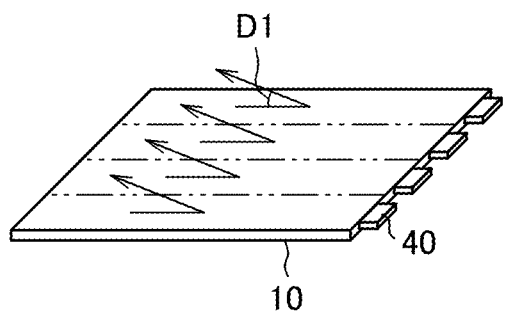
FIG. 13 is a perspective view to show a relation between the light guide and the LED in embodiment 2.

FIG. 13 is a perspective view of the light guide 10 and the LEDs 40, which are taken from FIG. 11. In FIG. 13, LEDs 40 are disposed on one side surface of the light guide 10. The two dot chain lines define an area that each of the LEDs 40 supplies light. In FIG. 13, when the LED 40 is turned on, the light is emitted from each of the areas of the light guide 10 in an angle D1 with respect to the major surface of the light guide 10 according to prism arrays formed on the bottom surface and the upper surface of the light guide 10 in each of the areas.

Figure 14:
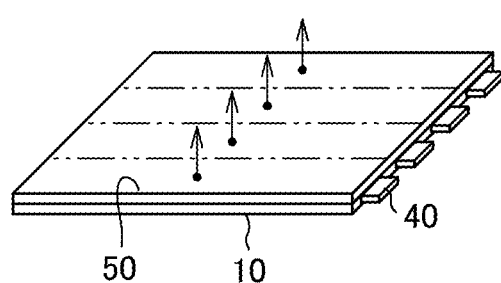
FIG. 14 is a perspective view to show a function when a first prism sheet is disposed on the light guide.

FIG. 14 is a perspective view in which the first prism sheet 50 is disposed on the light guide 10 of FIG. 13. The first prism sheet 50 directs the light, which is emitted from the light guide 10 in an angle D1 with respect to the upper surface (major surface), to the normal direction of the first prism sheet 50.

Figure 15:
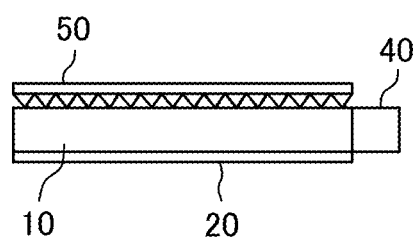
FIG. 15 is a cross sectional view in which the first prism sheet is disposed on the light guide.

FIG. 15 is a cross sectional view in which arrangement of the light guide 10, the reflection sheet 20, the first prism sheet 50 and LEDs 40 are shown. In FIG. 15, the prism arrays formed on the upper surface and the lower surface of the light guide 10 are not shown. The first prism sheet 50 is a so called a reverse prism sheet, in which the prism array is formed on the surface opposing to the light guide 10.

Figure 16:
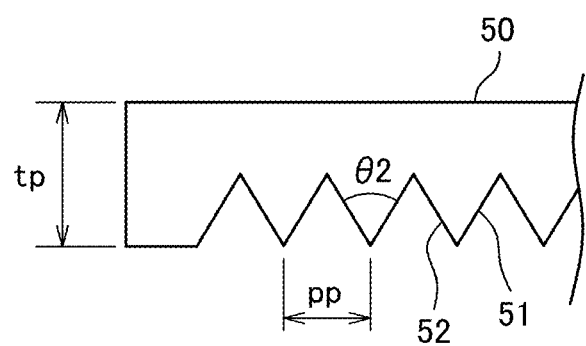
FIG. 16 is a cross sectional view to show a function of the prism of the first prism sheet.
Figure 16:
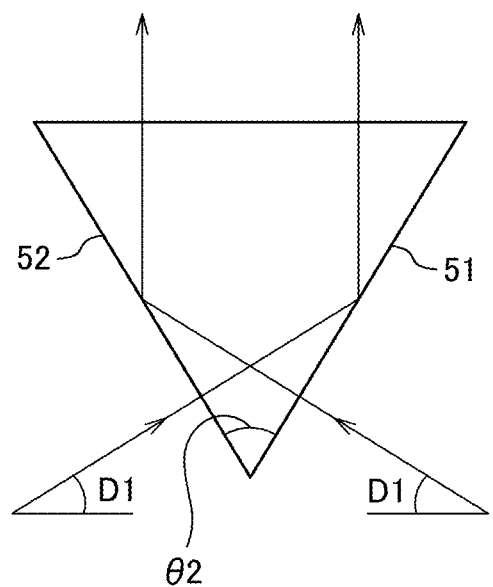

FIG. 16 includes a cross sectional view of the first prism sheet 50 and a cross sectional view of the prism in which the function of the prism of the first prism sheet 50 is shown. The prism of the first prism sheet 50 is an isosceles triangle. In the cross sectional view of the prism in FIG. 16, the light, emitted from the light guide 10 at an angle of D1 with respect to the major surface, enters the first surface 51 of the prism and goes straight; the light is totally reflected at the second surface 52 and goes out in normal direction from the upper surface of the prism. The light, emitted from the light guide 10 at an angle of D1 in reverse direction with respect to the major surface, enters the second surface 52 of the prism and goes straight; the light is totally reflected at the first surface 51 and goes out in normal direction from the upper surface of the prism.

That is to say, the first prism sheet 50 directs the light, emitted in either the left or the right direction from the light guide 10, to normal direction of the first prism sheet 50. By the way, the apex angle 82 of the prism of the first prism sheet 50 is changed according to an exit angle D1 of the light from the light guide 10.

Figure 17:
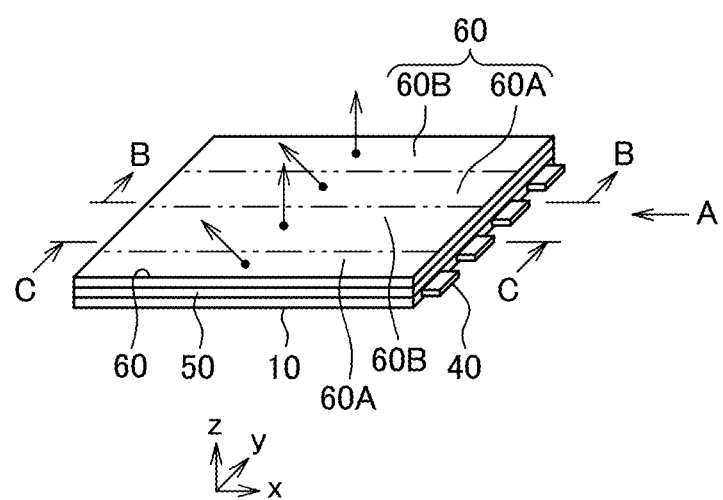
FIG. 17 is a perspective view to show a function when a second prism sheet is disposed on the first prism sheet.

FIG. 17 is a perspective view in which the second prism sheet 60 is disposed on the first prism sheet 50 shown in FIG. 14. In the second prism sheet 60, the first area 60A, in which a prism array is formed, and the second area 60B, in which no prism array is formed, namely, a flat plate, are disposed alternatingly in y direction.

As shown in FIG. 17, the light emitted from the first area 60A of the second prism sheet 60 has a certain angle with respect to the normal direction of the second prism sheet 60, while the light emitted from the second area 60B of the second prism sheet 60 is in normal direction of the second prism sheet 60. The light entered in normal direction of the second prism sheet 60 from the first prism sheet 50 is changed in the direction in the first area 60A, while the light goes straight in the second area 60B since there is no prism in the second area 60B.

Figure 18:
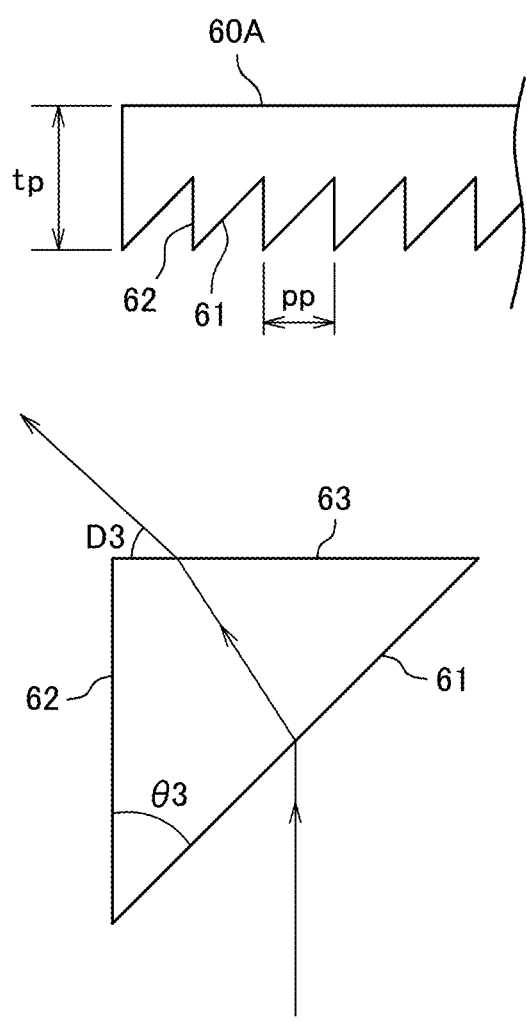
FIG. 18 is a cross sectional view to show a function of the prism of the second prism sheet.

FIG. 18 is a cross sectional view of the prism formed in the first area 60A of the second prism sheet 60. The prism in the first area 60A is a so called reverse prism sheet, in which the prism is formed on the lower surface. The cross sectional view of the prism is a rectangular triangle; the first surface 61 is in a degree of 83 with respect to normal direction to the major surface of the second prism sheet 60; and the second surface 62 is in normal direction to the major surface of the second prism sheet 60.

Figure 19:
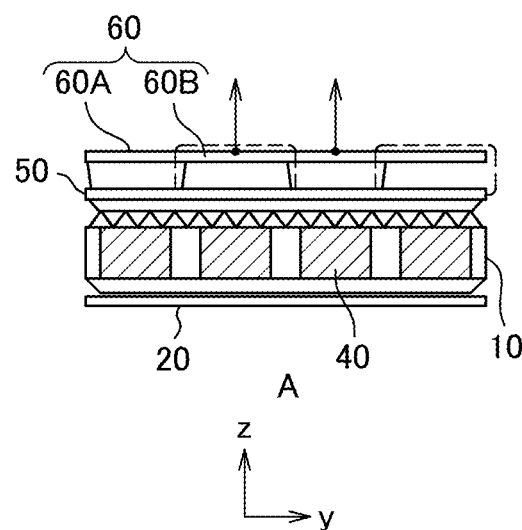
FIG. 19 is a side view when

In FIG. 18, the light emitted from the first prism sheet 50 is depicted by the arrow. The light emitted from the first prism sheet 50 enters the first surface 61 of the first area 60A of the second prism sheet 60. This light refracts at the first surface 61 and refracts again at the upper surface 63 and exits at an angle of D3 from the second prism sheet 60. The direction of light exiting from the first area 60A of the second prism sheet 60 can be controlled by changing the angle of the first surface 61 of the prism of the second prism sheet 60. FIG. 19 is a side view of FIG. 17 viewed from the arrow A.

In FIG. 19, the reflection sheet 20 is disposed under the light guide 10. In FIG. 19, LEDs 40 are disposed at a side of the light guide 10. Prism arrays are formed on the lower surface and the upper surface of the light guide 10; the light from LEDs 40 incident on the side surface of the light guide 10 exits from the upper surface (major surface) of the light guide 10 at certain angle.

The first prism sheet 50 is disposed on the light guide 10; the light from the light guide 10 is changed to the normal direction to the major surface of the first prism sheet 50 by the first prism sheet 50. The second prism sheet 60 is disposed on the first prism sheet 50. The light entered the first area 60A is refracted by the prism and exits the second prism sheet 60 at a predetermined angle. On the other hand, the light entered the second area 60B of the second prism sheet 60 goes straight in normal direction. However, the difference in exiting angles of the light is not perceptible in FIG. 19.

Figure 20:
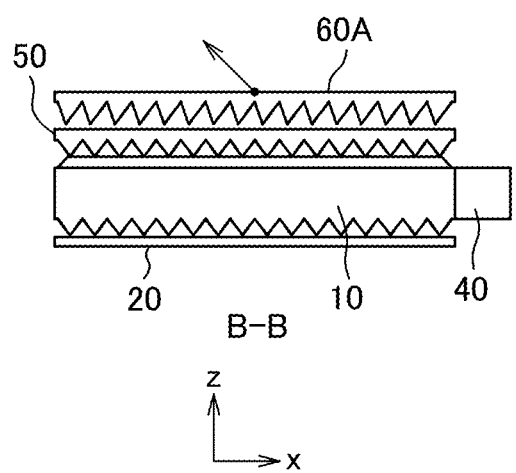
FIG. 20 is a cross sectional view along the line B-B of FIG. 17.

FIG. 20 is a cross sectional view along the line B-B of FIG. 17; namely, the cross sectional view at the first area 60A in which the prism is formed in the second prism sheet 60. The structure of FIG. 20 is the same as explained in FIG. 19. In FIG. 20, the light emitted from the major surface of the light guide 10 enters the first prism sheet 50. This light is changed its direction by the first prism sheet 50 to normal direction to the first prism sheet 50, and enters the first area 60A of the second prism sheet 60. Then, the light refracts at the first surface 61 and at the upper surface 63 of the prism in the first area 60A of the second prism sheet 60, and exits the second prism sheet 60 at predetermined angle to the normal direction of the second prism sheet 60.

Figure 21:
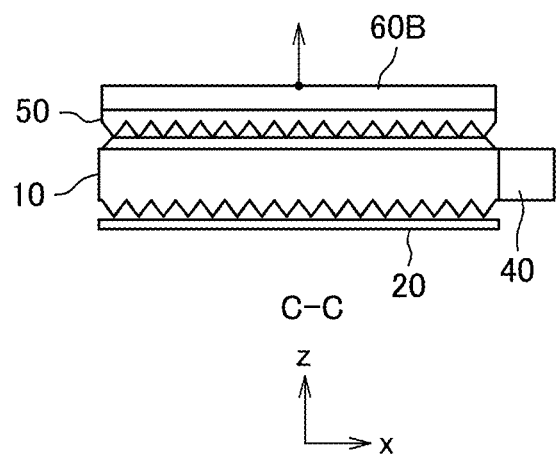
FIG. 21 is a cross sectional view along the line C-C of FIG. 17.

FIG. 21 is a cross sectional view along the line C-C of FIG. 17; namely, the cross sectional view at the second area 60B in which the prism is not formed in the second prism sheet 60. The structure of FIG. 21 is the same as explained in FIG. 19. The light pass of the light, emitted from the LEDs 40 and entered from the side surface of the light guide 10, is the same as explained in FIG. 20 up to exiting the first prism sheet 50. In FIG. 21, the light emitted from the first prism sheet 50 enters the second area 60B of the second prism sheet 60, in which no prism is formed, consequently, the light goes straight in normal direction to the second prism sheet 60.

Figure 22:
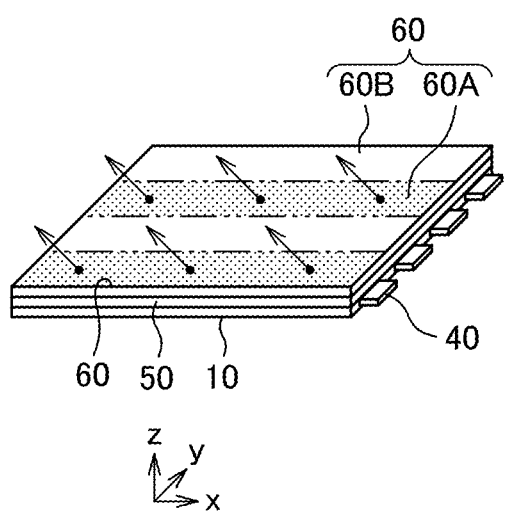
FIG. 22 is a perspective view to show a first example of embodiment 2.

FIG. 22 is an example in which only the light of predetermined angle to the second prism sheet 60 is emitted. In FIG. 22, the LEDs 40 corresponding to the area 60A, depicted as gray, in which prism is formed, are turned on. Since the light is not emitted from the area 60B, only the light at predetermined angle with respect to normal direction of the second prism sheet 60 is emitted.

Figure 23:
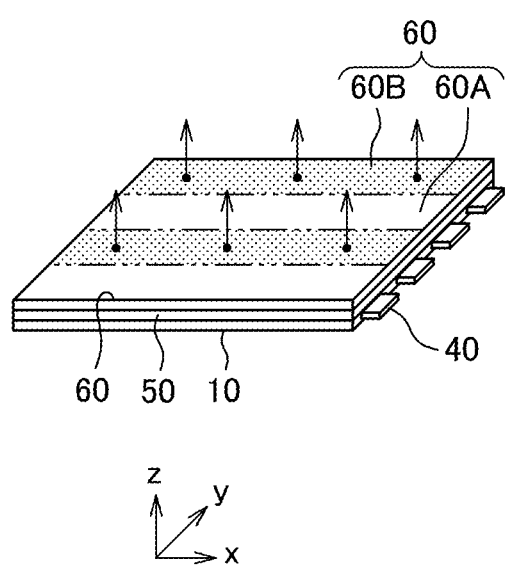
FIG. 23 is a perspective view to show a second example of embodiment 2.

FIG. 23 is an example in which only the light in normal direction to the second prism sheet 60 is emitted. In FIG. 23, the LEDs 40 corresponding to the area 60B, depicted as gray, in which no prism is formed, are turned on. Since the light is not emitted from the area 60A, only the light in normal direction to the second prism sheet 60 is emitted.

Figure 24:
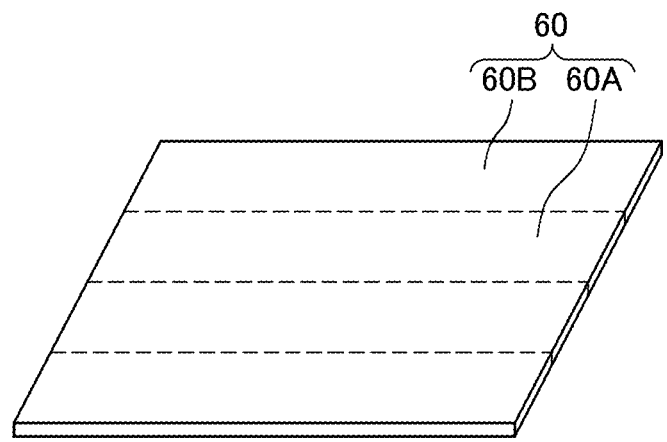
FIG. 24 is a first example of the second prism sheet.
Figure 25:
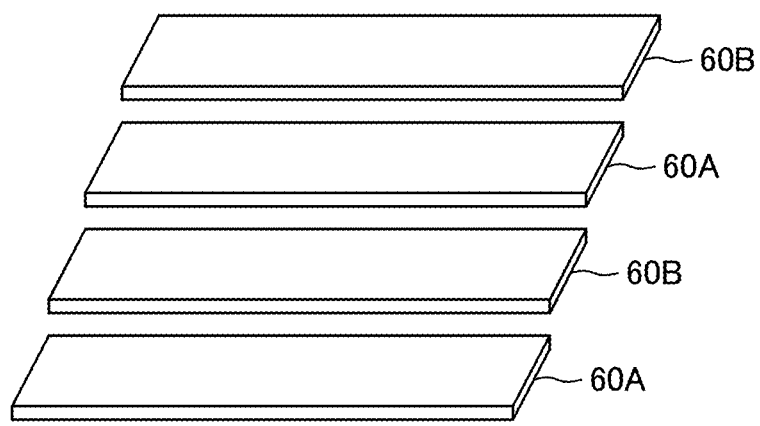
FIG. 25 is a second example of the second prism sheet.

The second prism sheet 60 can be formed by one sheet as shown in FIG. 24, however, as shown in FIG. 25, the second prism sheet 60 can be formed by alternatingly arranging the first area 60A and the second area 60B, which are formed separately, on the first prism sheet 50. In the meantime, the second area 60B is not necessary from a view point of optical function, however, a simple transparent sheet is used as the second area 60B to keep a uniformity in thickness in the second prism sheet 60 since a simple transparent sheet does not have any optical influence.

In the above explanation in embodiment 2, the LEDs 40 are disposed only on one side of the light guide 10. The structure of embodiment 2, however, can be applicable to the structure in which the LEDs 40 are disposed on opposing two sides of the light guide 10. Since the prism array formed on the light guide 10 is symmetrical, the light emitted from the light guide 10, no matter from which sides of the light guide 10 the light entered the light guide 10, can be directed to the normal direction to the first prism sheet 50 by the function of the first prism sheet 50.

As described above, if the LEDs 40 are disposed on both sides of the light guide 10 in the structure of embodiment 2, the brightness of the lighting device can be improved. In other words, a design freedom of brightness in the lighting device can be raised by setting LEDs 40 on both sides of the light guide 10 in embodiment 2.

When LEDs 40 are disposed on opposing two sides of the light guide 10, the light is emitted other than the intended directions, namely, other than the normal direction to the first prism sheet 50 or angle D3 direction. If the light having directivity is necessary, it is preferable not to set the LEDs 40 in opposing relation to each other as the structure of embodiment 2.

What is claimed is:

1. A lighting device comprising:
a light guide having a first side surface extending in a first direction and a second side surface opposing to the first side surface and extending in the first direction,
a first LED being disposed at the first side surface,
a second LED being disposed at the second side surface,
wherein an area in which the first LED is disposed and extends in the second direction is defined as a first area,
an area in which the second LED is disposed and extends in the second direction is defined as a second area,
a prism sheet is disposed on the light guide,
a prism extending in the first direction and arranged in the second direction is formed on the prism sheet,
a first surface of the prism has a first angle with normal direction of the second prism sheet,
a second surface of the prism has a second angle with normal direction of the second prism sheet, and
the first angle is larger than the second angle.

2. The lighting device according to claim 1,
wherein first light, which is totally reflected at the first surface and exits from the prism sheet, has a first angle with respect to normal direction to the prism sheet,
second light, which is totally reflected at the second surface and exits from the prism sheet, has a second angle with respect to normal direction to the prism sheet, and
the second angle is larger than the second angle.

3. The lighting device according to claim 1,
wherein a direction of the first light, which is totally reflected at the first surface and exits from the prism sheet, is normal to the prism sheet.

4. The lighting device according to claim 1,
wherein a first prism, which extends in the second direction and is arranged in the first direction, is formed on an upper surface of the light guide, and
a second prism, which extends in the first direction and is arranged in the second direction, is formed on a lower surface of the light guide.

5. The lighting device according to claim 4,
wherein a height and a pitch of the first prism formed on the upper surface of the light guide is smaller than a height and a pitch of the prism formed on the prism sheet, and
a height and a pitch of the second prism formed on the lower surface of the light guide is smaller than a height and a pitch of the prism formed on the prism sheet.

6. The lighting device according to claim 1,
wherein a surface of the prism sheet on which the prism is formed opposes to the light guide.

7. The lighting device according to claim 1,
wherein a direction of exiting light when only the first LED is turned on and a direction of exiting light when only the second LED is turned on are different.

8. A lighting device comprising:
a light guide having a first side surface extending in a first direction and a second side surface opposing to the first side surface and extending in the first direction,
a first LED and a second LED being disposed at either the first side surface or the second side surface,
wherein an area in which the first LED is disposed and extends in the second direction is defined as a first area,
an area in which the second LED is disposed and extends in the second direction is defined as a second area,
a first prism sheet is disposed on the light guide,
a first prism extending in the first direction and arranged in the second direction is formed on the first prism sheet,
light emitted from the first prism sheet is in a normal direction to the first prism sheet,
a second prism sheet, disposed on the first prism sheet, has a third area in which a second prism extending in the first direction and arranged in the second direction corresponding to the first area is formed, and a fourth area in which no prism is formed corresponding to the second area,
a direction of light exiting the fourth area is in normal direction of the second prism sheet, and
a direction of light exiting the third area forms an angle with respect to normal direction of the second prism sheet.

9. The lighting device according to claim 8,
wherein a cross sectional view of the prism formed on the first prism sheet is isosceles triangle, and
a cross sectional view of the prism formed on the second prism sheet is rectangular triangle.

10. The lighting device according to claim 8,
wherein the first LED and the second LED are disposed at the first side surface of the light guide.

11. The lighting device according to claim 9,
wherein the first LED and the second LED are disposed at the first side surface of the light guide and at the second side surface of the light guide.

12. The lighting device according to claim 8,
wherein the third area and the fourth area of the second prism sheet are formed as a unitized sheet.

13. The lighting device according to claim 8,
wherein the third area and the fourth area of the second prism sheet are formed separately and exit as a different entity.

14. The lighting device according to claim 8,
wherein a third prism, extending in the second direction and arranged in the first direction, is formed on an upper surface of the light guide, and
a fourth prism, extending in the first direction and arranged in the second direction, is formed on a lower surface of the light guide.

15. The lighting device according to claim 14,
wherein a height and a pitch of the third prism formed on the upper surface of the light guide is smaller than a height and a pitch of the second prism formed on the second prism sheet, and
a height and a pitch of the fourth prism formed on the lower surface of the light guide is smaller than a height and a pitch of the second prism formed on the prism second sheet.

16. The lighting device according to claim 8,
wherein a surface, on which the first prism is formed, of the first prism sheet opposes to the light guide, and
a surface, on which the second prism is formed, of the second prism sheet opposes to the first prism sheet.

17. The lighting device according to claim 8,
wherein a direction of exiting light from the lighting device when only the first LED is turned on is different from a direction of exiting light from the lighting device when only the second LED is turned on.

* * * * *